United States Patent [19]

Bohn et al.

[11] 4,004,328
[45] Jan. 25, 1977

[54] SNAP HOOK FOR FISHING TACKLE

[76] Inventors: August C. Bohn, 1423 Walnut SE., Grand Rapids, Mich. 49508; Glenn B. Morse, 321 Fountain NE., Grand Rapids, Mich. 49503

[22] Filed: Apr. 9, 1976

[21] Appl. No.: 675,584

Related U.S. Application Data

[63] Continuation of Ser. No. 554,478, March 3, 1975, abandoned.

[52] U.S. Cl. .................................................. 24/237
[51] Int. Cl.² ........................................ A44B 13/02
[58] Field of Search .......... 24/237, 73 C; 43/44.84

[56] References Cited

UNITED STATES PATENTS

| | | | |
|---|---|---|---|
| 1,107,910 | 8/1914 | Daly | 24/237 |
| 2,050,757 | 8/1936 | Leon | 24/73 C |
| 2,173,750 | 9/1939 | Braconi | 43/44.84 X |
| 2,449,045 | 9/1948 | Athans | 24/237 X |
| 3,263,879 | 8/1966 | Sanderson | 24/237 X |
| 3,750,240 | 8/1973 | Fridrich | 24/237 |

*Primary Examiner*—Roy D. Frazier
*Assistant Examiner*—Robert W. Gibson, Jr.
*Attorney, Agent, or Firm*—Glenn B. Morse

[57] ABSTRACT

A snap hook is formed of spring wire in a configuration based on a coil of preferably one and one-half turns. One tail of the coil is relatively short, and has a hook at its end. The longer tail is formed into a bight, and has a hook interengagable with the hook on the shorter tail. One of these hooks has a three-dimensional bend. Several forms of the invention are provided for minimizing snagging, and for ease of manipulation.

3 Claims, 8 Drawing Figures

SNAP HOOK FOR FISHING TACKLE

CROSS REFERENCE TO RELATED APPLICATIONS

This is a continuation of application Ser. No. 554,478, filed Mar. 3, 1975 now abandoned.

BACKGROUND OF THE INVENTION

Snap hooks are very common items of fishing tackle. They are used wherever disengagable connections are needed, such as in the attachment of hooks and lures to swivels, or in connecting any of these components directly to a fish line or leader. They are easily formed from spring steel wire, and must be of sufficient strength to withstand all of the forces normally applied to the fish line. They are preferably as small as possible, which produces a corresponding problem with respect to the limitation on resilience resulting from the desirable small size. Connecting and disconnecting these hooks can be a real problem, if unduly large forces are required. Adverse weather conditions will frequently result in decreasing a fisherman's dexterity with his fingers, as well as interfering with his vision. Preferably, these little devices should be engagable and disengagable entirely through a sense of touch, and with low enough forces involved that it does not become a feat of strength.

Some of the standard forms of snap hooks currently available include one form vaguely resembling a safety pin, in which one tail of a spring coil is provided with a hood receiving the opposite tail, which is bent into a bight. Since this configuration requires a combination of wire-bending, sheet metal forming, and the assembly of these components, the cost become a problem. Another common form of snap hook is essentially a double loop of wire, with the larger loop being a bight with a hook at its end engagable with a small fixed loop at the opposite end of the device. While the fixed loop connection considerably increases the strength of the snap hook, it eliminates all of the resilience at that end of the device. The only effective remaining resilience is provided by the bight as it extends from the point of fixed connection to the point of disengagement.

SUMMARY OF THE INVENTION

A snap hook is based upon a coil of preferably at one and one-half turns, with one tangential tail extension from this coil being relatively short, and provided with a hook configuration near or at its extreme end. The opposite tangential tail extension is formed into a bight, and the end portion as a hook configuration engagable with the hook on the opposite tail extension. At least one of these hook configurations is formed in three dimensions, to eliminate interference. In the simplest form of the invention, the two hook configurations extend in opposite directions, which are substantially perpendicular to the tail extensions at that point. The exact position of the interengaged hook configurations is thus determined by a balance of the resilience at the opposite ends of the snap hook (the bight and the coil). Preferably, the bight should have to be forced closed from its free position in order to interengage the hook configurations. A modified form of the invention provides an actuating extension of one of the hook configurations (preferably the one on the bight) to eliminate a tendency to poke a sharp point into the finger of the user, and to provide a reference degree of deflection for the lateral engagement and disengagement of the hook configurations. The invention also provides a modified configuration having the effect of shielding the hook configurations against fouling with weeds or foreign objects.

DESCRIPTION OF THE PREFERRED EMBODIMENTS

Figure 1:
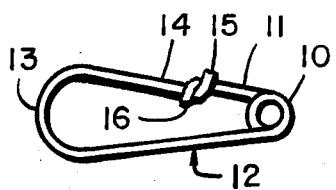
FIG. 1 is a side elevation of the simplest form of the invention.
Figure 2:
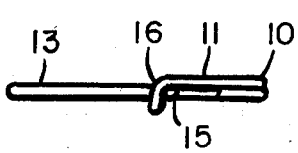
FIG. 2 is a top view showing the FIG. 1 device.
Figure 7:
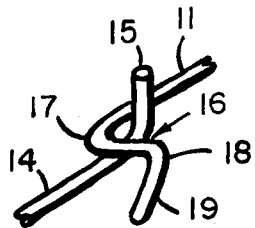
FIG. 7 is an enlarged perspective view of the interengaged hook portions, showing an optional bend configuration.

Referring to FIGS. 1 and 2, the illustrated device has an end coil 10 forming an eye normally used as one connection for attaching the snap hook to the other tackle components. The coil 10 has preferably one and one-half turns, with a shorter tangential tail extension 11, and a longer tangential tail extension 12. The latter is formed into a bight at 13, and the free end 14 has a hook configuration 15 interengagable with the hook configuration 16 at the end of the tail extension 11. Referring to FIG. 7, the hook 15 is formed by one ninety degree bend, and the hook 16 by a sequence to two bends 17 and 18 providing a three-dimensional configuration. The bend at 18 may be either at approximately ninety degrees, or may be slightly over-bent beyond ninety degrees, as is illustrated in FIG. 7. The bend 17 produces an offset such that the wire forming the portions 14 and 15 can be received between the portions 11 and 19, and this offset should be at least one and one-half diameters of the wire to provide ease of engagement and disengagement.

Figure 3:
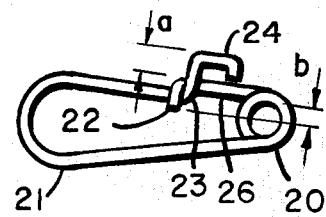
FIG. 3 is a side elevation of a modified form of the invention, which provides an actuating extension.
Figure 6:
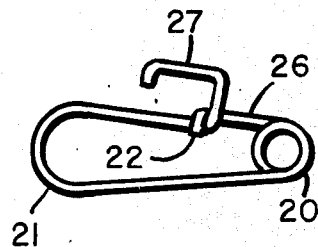
FIG. 6 illustrates a further modification providing an actuating extension.
Figure 8:
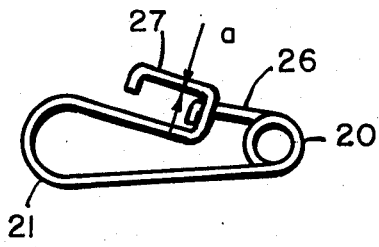
FIG. 8 shows the FIG. 6 modification deflected to a degree to permit lateral engagement and disengagement of the hook portions.

The snap hook illustrated in FIG. 3 has a coil 20, a bight 21, and a hook 22 similar, respectively, to the coil 10, the bight 13, and the hook 16 of FIG. 1. The hook 23 at the end of the bight, however, has an extension 24 that serves two functions. One of these is to provide a more hospitable surface for the engagement of the finger of the user, and the other is to provide a reference for determining the amount deflection necessary to engage and disengage the hook configurations 22 and 23. The distance indicated at $a$ is slightly in excess of the distance shown at $b$, with the result that depression of the extension 24 (accompanied by deflection of the bight) to the point where the extension 24 is immediately adjacent the tail extension 26 will produce a freedom for the hook 23 to be moved laterally sufficiently to disengage the hook 22, as shown in FIG. 8. As indicated in FIG. 8, the distance $a$ has been reduced to zero. In FIG. 8, however, the actuating extension 27 is reversed in direction from that of the extension 24 appearing in FIG. 3. This reversal is entirely optional. The un-deflected form of FIG. 8 appears in FIG. 6 in the normal closed position of the snap hook.

Figure 4:
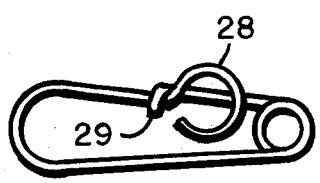
FIG. 4 illustrates a further modification of the invention, shown in side elevation, providing both an actuating extension and a shielding arrangement.
Figure 5:
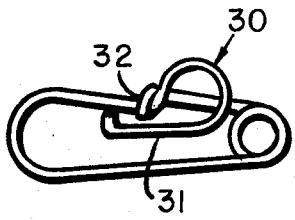
FIG. 5 is a side elevation of a further modification providing a different form of shielding from that of FIG. 4.

FIG. 4 shows a modification of the FIG. 3 arrangement in that the actuating extension 24 has been replaced by the eye 28. The snap hook is otherwise identical to that appearing in FIG. 3. The FIG. 4 arrangement has an added value in that the presence of the eye 28 provides a shielding effect for the hook 29, as it tends to displace weeds and foreign objects from the hook 29 as the device moves through the water. A more extensive shielding function is provided by the FIG. 5 configuration, in which the eye 30 has a tangential portion 31 extending past the hook 32. In all of these configurations, it should be kept in mind that any eye or other closure of the end of the bight should be kept open so as to produce a gap of sufficient size to interengage with the usual connecting terminals on fishing tackle.

It is preferable that all of these modifications of the invention be made of stainless steel wire, and of a diameter somewhere between .032 and .060 inches, depending upon the length of the device. The distance from the interengaged hook portions to the center of the coil should also be approximately one-third the distance from the center of the coil to the end of the bight.

We claim:
1. A snap hook formed of a single length of spring wire and comprising:
    a coil;
    a first extension projecting tangentially from said coil and terminating in a hook configuration;
    a second extension projecting tangentially from said coil, said second extension being formed into a bight and having a hook configuration complementary to that of said first extension; and
    an actuating extension at the free end of said second extension, said actuating extension a portion offset from and in the same plane as said second extension, the arrangement being such that depression of said offset portion moves the hook configuration of said second extension into a disengaging position relative to said hook configuration of said first extension.
2. The snap hook of claim 1 wherein the amount of offset of said portion of said actuating extension is slightly greater than the amount of movement required to effect disengagement of said hook configurations.
3. The snap hook of claim 1 wherein said actuating extension includes a reverse bend, a portion of said actuating extension extending across said hook configurations.

* * * * *